United States Patent
Nishida et al.

(12) 
(10) Patent No.: US 6,564,134 B2
(45) Date of Patent: May 13, 2003

(54) DRIVING FORCE CONTROL SYSTEM FOR FOUR-WHEEL DRIVE VEHICLES

(75) Inventors: Kenzo Nishida, Saitama-ken (JP); Norihisa Nihanda, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/817,019

(22) Filed: Mar. 27, 2001

(65) Prior Publication Data

US 2001/0025734 A1 Oct. 4, 2001

(30) Foreign Application Priority Data

Mar. 30, 2000 (JP) .......................... 2000-093991
Apr. 3, 2000 (JP) .......................... 2000-100586

(51) Int. Cl.$^7$ .............................................. G06F 19/00
(52) U.S. Cl. ............................................... 701/69
(58) Field of Search .................. 701/36, 66, 51–55, 701/67–69, 70–75, 82, 89, 91–92, 111; 477/7–8, 13, 57, 62–63, 70, 77, 79, 132, 83–87, 135–136, 138–141, 148, 166, 171, 179, 180–181; 180/233, 249–250; 475/269, 320–322, 308–310, 314–316, 326–328

(56) References Cited

U.S. PATENT DOCUMENTS 4,729,450 A * 3/1988 Morisawa et al. .......... 180/249
4,751,856 A * 6/1988 Nakamura et al. .......... 180/249
5,754,970 A * 5/1998 Takasaki et al. ............ 180/233

FOREIGN PATENT DOCUMENTS

JP   10-194005   7/1998

* cited by examiner

Primary Examiner—Thu Nguyen
(74) Attorney, Agent, or Firm—Armstrong, Westerman & Hattori, LLP

(57) ABSTRACT

A driving force control system for a four-wheel drive vehicle for controlling the execution and cancellation of a lock mode in which the engagement forces of clutches for distributing a driving force to auxiliary drive wheels are made maximum. The driving force control system properly controls the engagement forces of clutches for distributing a driving force of the main drive wheels to auxiliary drive wheels. When the vehicle is determined to be in a predetermined low vehicle speed condition and the transmission is in any of predetermined low-speed shift positions, execution of a lock mode is permitted in which the clutch engagement forces are controlled to lock the main and auxiliary drive wheels to each other. When the driving force of the main drive wheels is lower than a predetermined value, the clutch engagement forces for the lock mode are limited to smaller ones than the lockable ones.

5 Claims, 9 Drawing Sheets

DRIVING FORCE CONTROL SYSTEM FOR FOUR-WHEEL DRIVE VEHICLES

BACKGROUND OF THE INVENTION

1. Field of the Invention

This invention relates to a driving force control system for a four-wheel drive vehicle, which controls the engagement forces of clutches to thereby control the drive forces distributed to auxiliary drive wheels.

2. Description of the Related Art

A driving force control system of this kind has been proposed by the present assignee in Japanese Laid-Open Patent Publication (Kokai) No. 10-194005, for a four-wheel drive vehicle including left and right front wheels as main drive wheels, and left and right rear wheels as auxiliary drive wheels. The engine of the vehicle is connected to the left and right front wheels via an automatic transmission, a front differential, and left and right front drive shafts. Further, the front differential is connected to the left and right rear wheels via a transfer, a propeller shaft, a rear differential, and left and right drive shafts.

The driving force control system includes left and right electromagnetic clutches provided for the rear differential, an electronic control unit ("ECU") for control of these electromagnetic clutches, and a lock switch arranged on a dash board. The ECU controls the supply and cut-off of electric current to the solenoid coils of the respective clutches, whereby the clutches connect and disconnect the associated rear drive shafts to and from the propeller shaft. When these clutches are disengaged, the driving force of the engine is transmitted to the front wheels alone to thereby bring the vehicle into the front-wheel drive mode, whereas when the same are engaged, the driving force of the engine is also distributed to the rear wheels to bring the vehicle into the four-wheel drive mode. The engagement forces of the electromagnetic clutches are continuously changed according to the amounts of current supplied thereto, and the ECU controls the amounts of supplied current to vary the respective engagement forces of the left and right electromagnetic clutches whereby the driving forces distributed to the left and right rear drive wheels can be controlled independently of each other, as desired.

Further, when the driver operates the lock switch, the ECU executes a lock mode in which the amounts of current supplied to the clutches are made maximum to generate the maximum clutch engagement forces so as to maximize the driving forces distributed to the rear wheels. This makes it possible, for instance, to easily extricate the vehicle from a stuck condition on a snowy road.

However, the conventional driving force control system is configured such that the lock mode is unconditionally executed when the lock switch is operated. Therefore, if the driver operates the lock switch without the knowledge of the function of the lock switch or by mistake, the lock mode is unnecessarily executed. As a result, during this lock mode, the maximum amount of current continues to be supplied to the electromagnetic clutches to waste the electric power, and further fuel economy is degraded due to traveling of the vehicle in the four-wheel drive mode, which is fuel-consuming and, in this case, unnecessary. This can adversely affect the drivability as well, depending on the conditions of the vehicle. Further, the clutches are operated at their maximum engagement forces frequently and over extended time periods, so that the durability of the clutches is also degraded, which will offer an obstacle to the reduced size of electromagnetic clutches.

Further, in the conventional driving force control system, the lock mode is executed in a state where the clutch engagement forces are fixedly held at the maximum. On the other hand, after the vehicle gets unstuck from a stuck condition, the vehicle sometimes enters a traffic-congested traveling condition in which the running of the vehicle is controlled by engine brake or foot brake, with the accelerator pedal being scarcely stepped on by the user, and its lock switch being kept ON. In such a case, the engine output torque assumes a negative or small value, and hence it is almost unnecessary to distribute the driving force delivered to the front wheels to the rear wheels. Despite the fact, the vehicle continues to be in the lock mode in which the maximum clutch engagement forces are generated, and hence a large amount of electric power is wastefully consumed due to supply of the maximum amounts of current to the electromagnetic clutches.

SUMMARY OF THE INVENTION

It is a first object of the invention to provide a driving force control system for a four-wheel drive vehicle, which is capable of properly controlling the execution and cancellation of a lock mode in which the engagement forces of clutches for distributing a driving force to auxiliary drive wheels are made maximum, thereby reducing frequency and duration of the lock mode.

It is a second object of the invention to provide a driving force control system for a four-wheel drive vehicle, which is capable of properly controlling the engagement forces of clutches for distributing a driving force of the main drive wheels to auxiliary drive wheels, thereby causing the clutches to efficiently operate without waste of power.

To attain the first object, according to a first aspect of the invention, there is provided a driving force control system for a four-wheel drive vehicle including a pair of front wheels, a pair of rear wheels, an engine, a transmission for connecting one of the pair of front wheels and the pair of rear wheels to the engine, as main drive wheels, and clutches for connecting another of the pair of front wheels and the pair of rear wheels to the main drive wheels, as auxiliary drive wheels, the driving force control system controlling engagement forces of the clutches to thereby control distribution of a driving force of the main drive wheels to the auxiliary drive wheels.

The driving force control system according to the first aspect of the invention is characterized by comprising:

input means for being operated by a driver;

lock mode execution means for executing a lock mode in which the engagement forces of the clutches are set to predetermined maximum engagement forces, when the input means is operated;

low vehicle speed condition-determining means for determining whether or not the vehicle is in a predetermined low vehicle speed condition;

shift position-detecting means for detecting a shift position of the transmission; and lock mode execution-permitting means for permitting the lock mode execution means to execute the lock mode, when the low vehicle speed condition-determining means determines that the vehicle is in the predetermined low vehicle speed condition, and at the same time the shift position-detecting means detects any of predetermined low-speed shift positions of the transmission.

According to this driving force control system, the lock mode execution means executes the lock mode in which the engagement forces of clutches for distributing a driving force to auxiliary drive wheels are made maximum, on condition that the input means is operated by the driver. Further, when the vehicle is determined to be in a predetermined low-vehicle speed condition, and at the same time the shift position of the transmission is detected to be any of predetermined low-speed shift positions, the lock mode execution-permitting means permits execution of the lock mode. The lock mode is executed by its nature mainly for the purpose of facilitating e.g. the extrication of the vehicle from a stuck condition, and hence the execution thereof is basically unnecessary when the vehicle is not in a low vehicle speed condition, including the stoppage of the same, or when the shift position of the transmission is in a medium or high speed position. Therefore, as described above, the lock mode is not executed only by operation of the input means, but is allowed to be executed on condition that the vehicle is in the predetermined low vehicle speed condition, and at the same time the shift position of the transmission is in any of the predetermined low-speed shift positions, whereby the lock mode can be executed depending on the conditions of the vehicle only when it is really required. This makes it possible to reduce the frequency and duration of execution of the lock mode.

Preferably, the driving force control system further includes lock mode-canceling means for canceling the lock mode after the lock mode execution means starts the lock mode, when the input means is operated.

More preferably, the lock mode-canceling means cancels the lock mode when the shift position-detecting means detects any shift position other than the predetermined low-speed shift positions of the transmission irrespective of whether the input means is operated or not.

According to this preferred embodiment, during execution of the lock mode, when the shift position of the transmission is shifted to any shift position other than the predetermined low-speed shift positions, the lock mode-canceling means cancels the lock mode in response to detection of the above-mentioned shift of the shift position by the shift position-detecting means. As mentioned above, the lock mode is executed mainly for the purpose of facilitating e.g. the extrication of the vehicle from a stuck condition, and hence basically unnecessary when the vehicle is not in a low vehicle speed condition. Therefore, when any shift position other than the predetermined low-speed shift positions is detected during the lock mode, by automatically canceling the lock mode without waiting for the driver to operate the input means, the lock mode can be canceled early, thereby reducing the duration of the lock mode.

More preferably, the lock mode-canceling means cancels the lock mode upon the lapse of a predetermined time period after the shift position-detecting means detects the any shift position other than the predetermined low-speed shift positions of the transmission.

According to this preferred embodiment, during the execution of the lock mode, even if the quick operation of the shift lever (i.e. operation of quickly reciprocatingly shifting the shift lever between a rear shift position for moving the vehicle rearward and a medium or high speed shift position, so as to make the vehicle get unstuck while causing forward and backward rocking motions of the vehicle) is carried out to make the vehicle unstuck, causing the shift lever to move across any shift position other than the predetermined low-speed shift positions, the lock mode is not cancelled but maintained, thereby enabling the vehicle to get unstuck, by the quick operation.

To attain the first object, according to a second aspect of the invention, there is provided a driving force control system for a four-wheel drive vehicle including a pair of front wheels, a pair of rear wheels, an engine, a transmission for connecting one of the pair of front wheels and the pair of rear wheels to the engine, as main drive wheels, and clutches for connecting another of the pair of front wheels and the pair of rear wheels to the main drive wheels, as auxiliary drive wheels, the driving force control system controlling engagement forces of the clutches to thereby control distribution of a driving force of the main drive wheels to the auxiliary drive wheels.

The driving force control system according to the second aspect of the invention is characterized by comprising:

input means for being operated by a driver;

lock mode execution means for executing a lock mode in which the engagement forces of the clutches are set to predetermined maximum engagement forces, when the input means is operated;

shift position-detecting means for detecting a shift position of the transmission; and lock mode-canceling means for canceling the lock mode when the shift position-detecting means detects any shift position other than predetermined low-speed shift positions of the transmission, during execution of the lock mode.

According to this driving force control system, it is possible to obtain the same effects as obtained by the driving force control system according to the first aspect of invention which includes the lock mode-canceling means.

Preferably, the lock mode-canceling means cancels the lock mode upon the lapse of a predetermined time period after the shift position-detecting means detects the any shift position other than the predetermined low-speed shift positions of the transmission.

According to this preferred embodiment, it is possible to obtain the same effects as described as to the preferred embodiment of the first aspect of the invention.

To attain the second object, according to a third aspect of the invention, there is provided a driving force control system for a four-wheel drive vehicle including a pair of front wheels, a pair of rear wheels, an engine to which one of the pair of front wheels and the pair of rear wheels is connected as main drive wheels, and clutches for connecting another of the pair of front wheels and the pair of rear wheels to the main drive wheels, as auxiliary drive wheels, the driving force control system controlling engagement forces of the clutches to thereby control distribution of a driving force of the main drive wheels to the auxiliary drive wheels.

The driving force control system according to the third aspect of the invention is characterized by comprising:

driving force calculation means for calculating a driving force of the main drive wheels;

input means for being operated by a driver;

lock-mode engagement force-setting means for setting engagement forces of the clutches for a lock mode, including lockable clutch engagement forces which can lock the main drive wheels and the auxiliary drive wheels to each other, when the input means is operated; and lock mode execution means for executing the lock mode based on the set engagement forces of the clutches for the lock mode.

According to this driving force control system, when the driver operates the input means, the lock-mode engagement force-setting means sets the engagement forces of the clutches (clutch engagement forces) for the lock mode. The lock mode execution means executes the lock mode based on the set clutch engagement forces for the lock mode. The clutch engagement forces for the lock mode includes lockable clutch engagement forces which can lock the main drive wheels and the rear drive wheels to each other, and hence the front and rear drive wheels can be locked to each other according to an intention of the driver. Further, the clutch engagement forces for the lock mode are set according to the driving force actually delivered from the engine to the main drive wheels, which makes it possible to properly distribute the driving force to the auxiliary drive wheels. This makes it possible to cause the clutches to operate efficiently without waste of power during the lock mode, and in the case of the clutches being electromagnetic clutches, electric power can be saved.

Preferably, the lock-mode engagement force-setting means sets the engagement forces of the clutches for the lock mode to smaller ones than the lockable clutch engagement forces, when the driving force of the main drive wheels calculated by the driving force calculation means is smaller than a predetermined value.

According to this preferred embodiment, the clutch engagement forces for the lock mode are limited to smaller ones than the lockable clutch engagement forces when the driving force of the main drive wheels calculated by the driving force calculation means is lower than a predetermined value. This makes it possible to limit the engagement forces of the clutches during the lock mode to smaller ones, when the necessity for distributing the driving force of the main drive wheels to the auxiliary drive wheels is small due to a small actual driving force of the main drive wheels. Further, since the clutch engagement forces are limited depending on the actual driving force delivered from the engine to the main drive wheels, it is possible to properly carry out the limitation of the clutch engagement forces. This makes it possible to cause the clutches to efficiently operate without waste of power, and in the case of the clutches being the electromagnetic clutches, electric power can be saved.

Preferably, the lock-mode engagement force-setting means sets the engagement forces of the clutches for the lock mode to smaller ones as the driving force of the main drive wheels is smaller.

According to this preferred embodiment, the clutch engagement forces can be finely limited according to the necessity of distribution of the driving force to the auxiliary drive wheels, which makes it possible to cause the clutches to operate more efficiently.

Preferably, the driving force control system includes vehicle speed detection means for detecting a traveling speed of the vehicle, and the lock-mode engagement force-setting means sets the engagement forces of the clutches for the lock mode to smaller ones as the traveling speed of the vehicle is larger.

More preferably, the lock-mode engagement force-setting means sets the engagement forces of the clutches for the lock mode to smaller ones dependent on the traveling speed of the vehicle, during deceleration of the vehicle in which the driving force of the main drive wheels assumes a negative value.

Preferably, the driving force calculation means calculates the driving force by using different calculating equations when the engine is in a normal condition and when the engine is in a faulty condition, respectively.

The above and other objects, features, and advantages of the invention will become apparent from the following detailed description taken in conjunction with the accompanying drawings.

DETAILED DESCRIPTION OF PREFERRED EMBODIMENT

The invention will now be described in detail with reference to the drawings showing an embodiment thereof.

Figure 1:
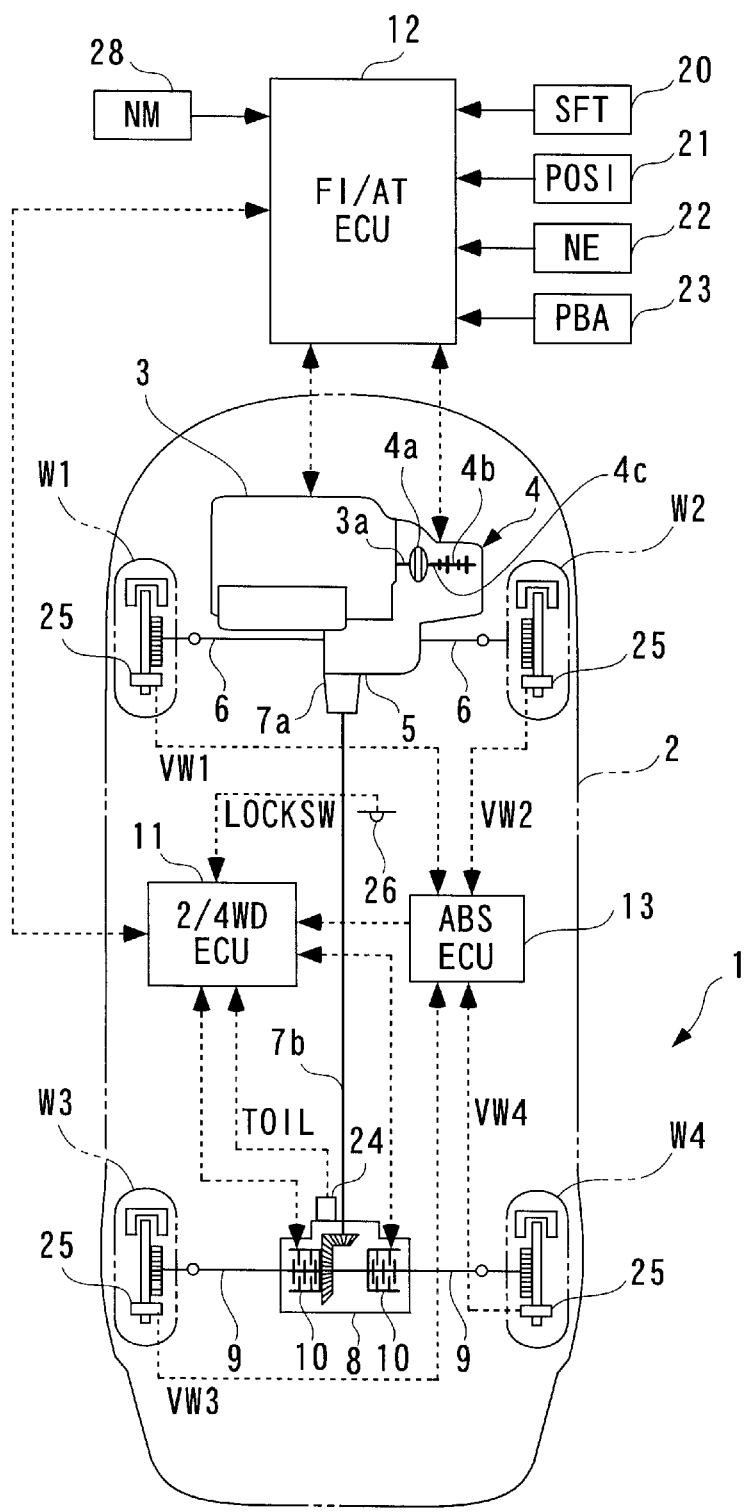
FIG. 1 is a view schematically showing the whole arrangement of a four-wheel drive vehicle incorporating a driving force control system according to an embodiment of the invention.

FIG. 1 schematically shows the whole arrangement of a four-wheel drive vehicle 2 incorporating a driving force control system 1 according to an embodiment of the invention. As shown in the figure, the four-wheel drive vehicle 2 (hereinafter simply referred to as "the vehicle") includes an engine 3 transversely mounted in a front portion thereof and an automatic transmission (transmission) 4 integrally arranged with the engine 3.

The automatic transmission 4 is comprised of a torque converter 4a for transmitting torque, a shift lever, not shown, which is capable of selecting any one of the eight shift positions of "1, 2, 3, D4, D5, N, R, and P", and a gear mechanism 4b, partly shown, which can be shifted to any of six gear positions having respective change gear ratios, i.e. first to fifth speed gear positions and a reverse gear position. The torque converter 4a has an input side thereof directly connected to an output shaft 3a of the engine 3 and an output side thereof connected to a main shaft 4c of the gear mechanism 4b. In the automatic transmission 4, when the shift position is set to "1" to "D5", and "R", the gear position of the automatic transmission 4 is switched to the first speed gear position, any within a range of the first and second speed gear positions, any within a range of the first to third speed gear positions, any within a range of the first to fourth speed gear positions, any within a range of the first to fifth speed gear positions, and the reverse gear position, respectively.

The automatic transmission 4 has a gear position sensor 20 and a shift position sensor 21 mounted therein. The gear position sensor 20 detects a gear position, and delivers a signal SFT indicative of the detected gear position to an FI/AT·ECU 12, referred to hereinafter. The gear position signal SFT assumes values (hereinafter referred to as "SFT values") of "1" to "5", and "6", for the first to fifth speed gear positions and the reverse gear position, respectively.

The shift position sensor 21 senses a selected shift position of the transmission 4 and delivers a shift position signal POSI indicative of the sensed shift position to the FI/AT·ECU 12. More specifically, the shift position signal POSI assumes a value of "1" for the shift position of "N" or "P", a value of "2" for the shift position of "R", and values of 3 to 7 for the respective shift positions of "1" to "D5". Further, when the automatic transmission 4 is in "no-position" (state in which the shift position of the automatic transmission 4 cannot be identified since the shift lever is located between shift positions), the value of the shift position POSI is "0".

The above FI/AT·ECU 12 is formed or implemented by a microcomputer including a RAM, a ROM, a CPU, and an I/O interface, none of which are shown, and controls the operation of the engine 3, the operation of the automatic transmission 4, and so forth. Connected to this FI/AT·ECU 12 are an engine rotational speed sensor 22 and an intake pipe absolute pressure sensor 23. The sensor 22 senses an engine rotational speed NE and delivers a signal indicative of the sensed engine rotational speed NE to the FI/AT·ECU 2, while the sensor 23 senses an intake pipe absolute pressure PBA within an intake pipe, and delivers a signal indicative of the sensed absolute pressure PBA to the FI/AT·ECU 2. Also connected to the FI/AT·ECU 12 is a main shaft rotational speed sensor 28 for detecting a rotational speed NM of the main shaft 4c of the automatic transmission 4. The FI/AT·ECU 12 uses the engine rotational speed NE and the main shaft rotational speed NM, as an input rotational speed of a torque converter 4a and an output rotational speed of the same, respectively, to calculate an output/input rotational speed ratio ETR (ETR=NM/NE) of the torque converter 4a.

The engine 3 has the output shaft 3a thereof connected to left and right front wheels W1, W2 as main drive wheels via the automatic transmission 4, a front differential 5 and front drive shafts 6, 6. Further, the output shaft 3a is connected to left and right rear wheels W3, W4 as auxiliary drive wheels via the automatic transmission 4, the front differential 5, a transfer 7a, a propeller shaft 7b, a rear differential 8, and left and right rear drive shafts 9, 9.

The rear differential 8 includes left and right electromagnetic clutches (clutches) 10, 10. The electromagnetic clutches 10, 10 have their respective solenoid coils energized or deenergized (supplied or not supplied with electric current) to thereby connect and disconnect the propeller shaft 7b to and from the rear drive shafts 9 associated therewith. When the electromagnetic clutches 10, 10 disconnect the propeller shaft 7b from the rear drive shafts 9, all the drive torque from the engine 3 is transmitted to the front wheels W1, W2, whereby the vehicle is set to a front-wheel drive mode. On the other hand, when the electromagnetic clutches 10, 10 connect the propeller shaft 7b to the rear drive shafts 9, 9, the drive torque of the engine 3 is also transmitted or distributed to the rear wheels W3, W4, whereby the vehicle is set to a four-wheel drive mode. Further, the electromagnetic clutches 10, 10 are configured such that the engagement force of each of them is continuously changed according to the amount of electric current supplied to its solenoid coil, and a 2/4WD·ECU 11, referred to hereinafter, controls the amounts of the supplied electric current to vary the engagement forces of the left and right electromagnetic clutches as desired to thereby control drive torques distributed to the left and right rear wheels W3, W4 independently of each other.

The rear differential 8 is provided with an oil temperature sensor 24 which senses a temperature (oil temperature) TOIL of lubricating oil lubricating the electromagnetic clutches 10, 10, and delivers a signal indicative of the sensed oil temperature TOIL to the 2/4WD·ECU 11.

Further, wheel speed sensors 25 are mounted to the front and rear wheels W1 to W4, respectively. The four wheel speed sensors 25 sense respective wheel speeds VW1 to VW4 of the wheels W1 to W4, and deliver signals indicative of the sensed wheel speeds VW1 to VW4 to an ABS·ECU 13. The ABS·ECU 13 is formed by a microcomputer, similarly to the FI/AT·ECU 12 described above, and carries out anti-lock control of the front and rear wheels W1 to W4.

On a dashboard, not shown, there is provided a lock switch 26 as input means. The lock switch 26 is operated by the driver when he wants to lock the rear differential 8 so that a large drive torque can be transmitted to the rear wheels W3, W4 e.g. for extrication of the vehicle from a stuck condition on a snowy road. The lock switch 26 is formed by a momentary switch and continues delivering a lock switch signal LOCKSW to the 2/4WD·ECU 11 so long as it is being depressed. Further, during a lock mode, a lock lamp, not shown, arranged on the dashboard is lit.

The 2/4WD·ECU 11 forms a main part of the driving force control system 1 according to the invention, and it is implemented, similarly to the FI/AT·ECU 12 and ABS·ECU 13, by a microcomputer. The signals from the sensors 20 to 25 and results of calculations made based on these signals are input via the ECU's 12, 13 to the 2/4WD·ECU 11 by serial communication. In response to these signals, the 2/4 WD·ECU 11 executes control programs read from the ROM, using values of flags and computational values, referred to hereinafter, stored in the RAM to calculate the drive torques to be distributed to the rear wheels W3, W4, and the amounts of electric current to be supplied to the solenoid coils of the electromagnetic clutches 10, 10 commensurate with the respective calculated drive torques, as described hereinafter, and supplies drive signals generated based on the results of the calculations to the electromagnetic clutches 10, 10 to thereby vary the engagement forces thereof for control of the driving forces distributed to the rear wheels W3, W4. Further, the 2/4WD·ECU 11 carries out lock mode control in response to the lock switch signal LOCKSW from the lock switch 26.

Figure 2:
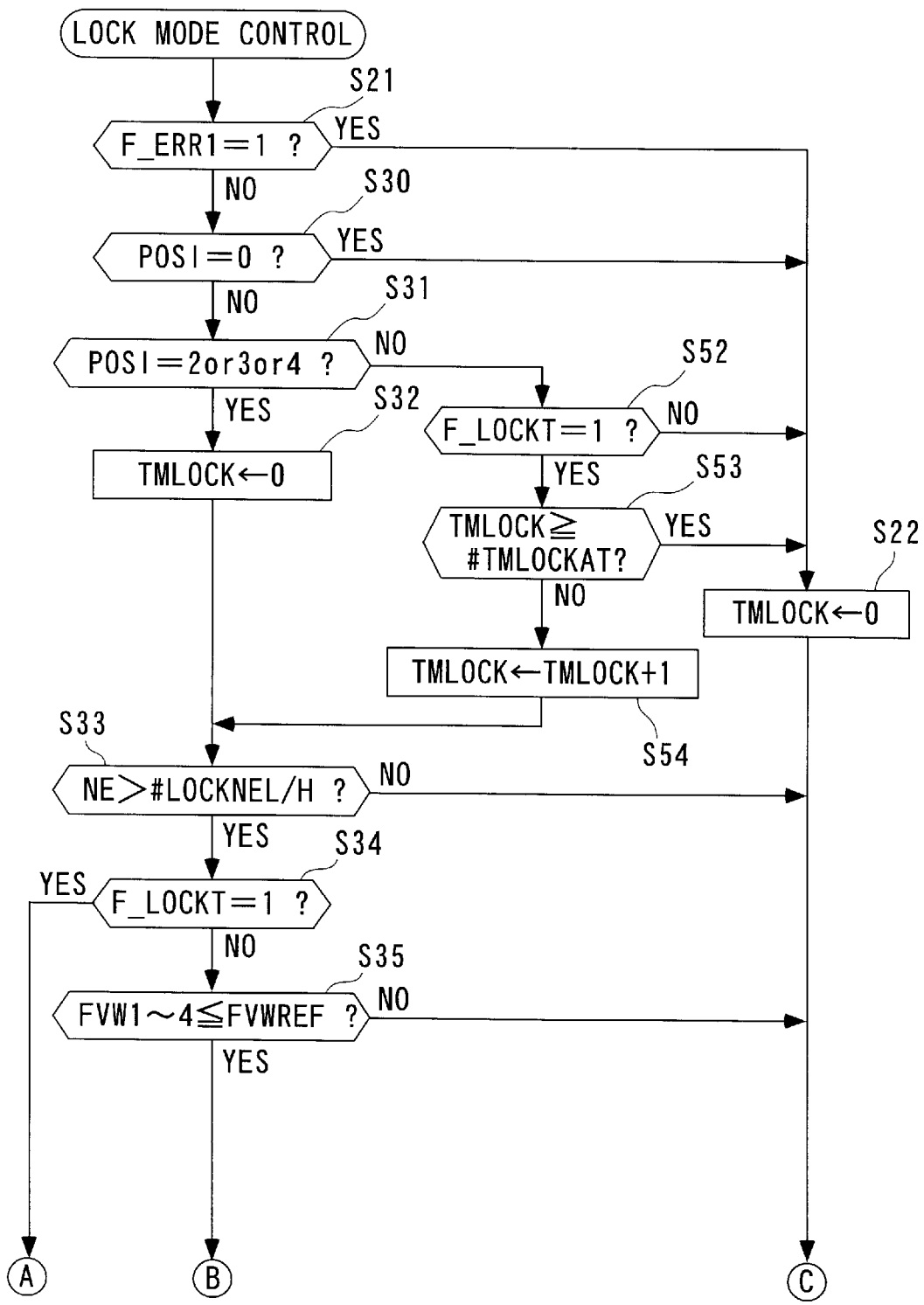
FIG. 2 is a flowchart showing a main flow for carrying out a lock mode control process.
Figure 3:
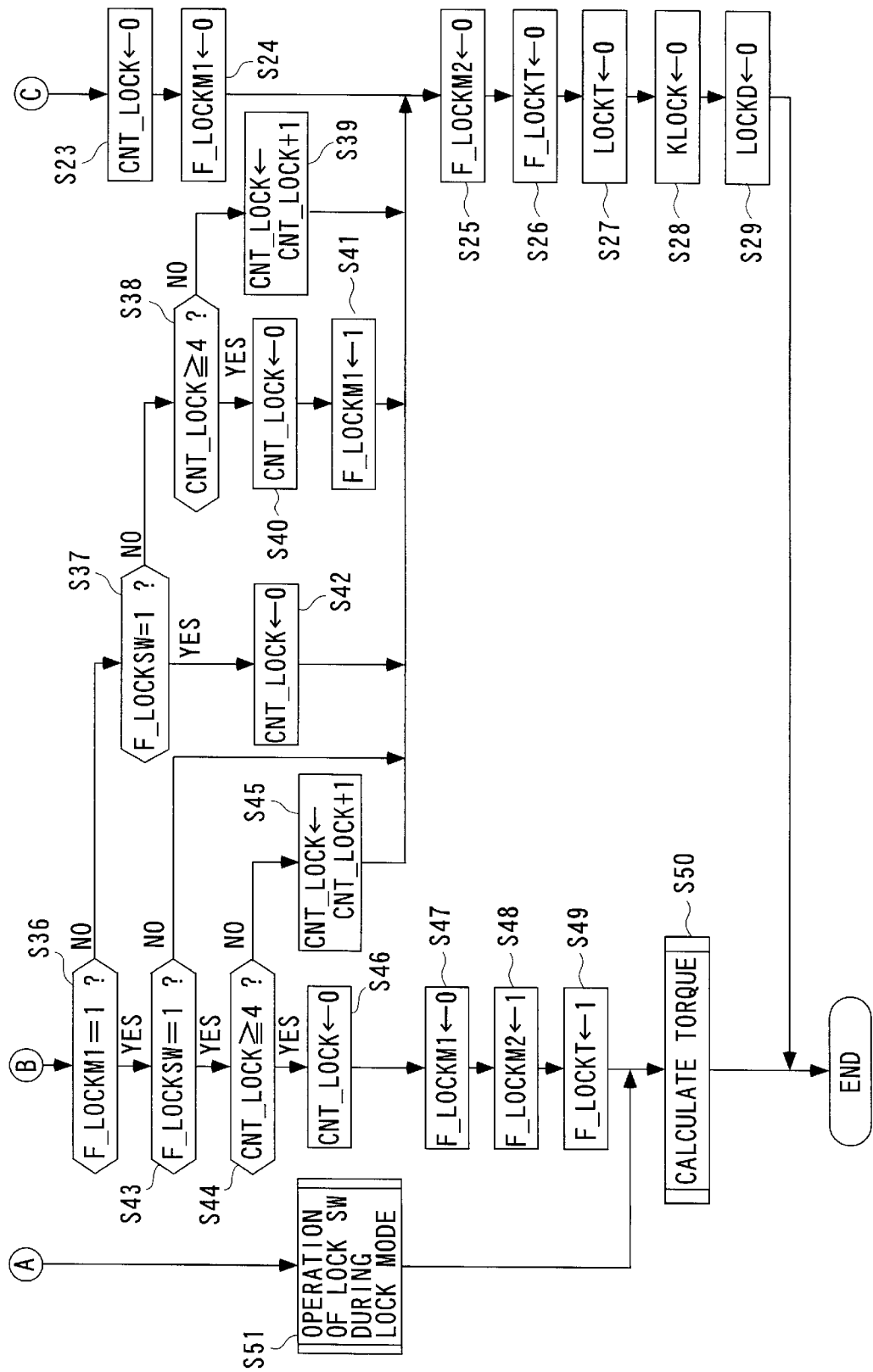
FIG. 3 is a continuation of the FIG. 2 flowchart.

FIGS. 2 and 3 show a main routine for carrying out a lock mode control process. This program is executed at predetermined time intervals. It should be noted that in the following description, a mark # is added to each of heads of fixed values that are stored beforehand in the ROM as data items and table values, so as to show the fixed values in a state distinguishable from other variables that are stored in the RAM and updated.

In the lock mode control process, first, it is determined at a step S21 whether or not a fail flag F_ERR1 assumes "1". If the answer to the question is affirmative (YES), i.e. if failure of the control system has already been determined, the program proceeds to steps S22 to S29 without executing the lock mode, whereby a lock mode cancellation timer TMLOCK, a lock counter CNT_LOCK, a lock mode-setting switching condition satisfaction flag F_LOCKM1, a lock mode-canceling switching condition satisfaction flag F_LOCKM2, a lock mode flag F_LOCKT, a basic value LOCKT of the lock-mode transmitted torque, a power-saving coefficient KLOCK, and the lock-mode transmitted torque LOCKD, all referred to hereinafter, are set to "0", at respective steps, followed by terminating the program.

On the other hand, if the answer to the question of the step S21 is negative (NO), it is determined at a step S30 whether or not the value of the shift position POSI detected by the shift position sensor 21 is equal to 0. If the answer to the question is affirmative (YES), i.e. if the shift lever is in the no-position state, the program proceeds to the steps S22 et seq., whereas if the answer to the question of the step S30 is negative (NO), it is determined at a step S31 whether or not the value of the shift position POSI is equal to 2, 3 or 4, i.e. whether or not the shift position is "R", "1", or "2" (i.e. in any of predetermined low-speed shift positions).

If the answer to the question of the step S31 is affirmative (YES), i.e. if the shift position is any one of "R", "1" and "2", the count of the lock mode cancellation timer TMLOCK is reset to "0" at a step S32. Then, it is determined at a step S33 whether or not the engine rotational speed NE is higher than a predetermined rotational speed #LOCKNEL/H (e.g. 300/500 rpm) with a hysteresis. If the answer to the question is negative (NO), i.e. if NE≦#LOCKNEL/H holds, it is judged that the engine 3 is substantially in stoppage, and the steps S23 et seq. are carried out without executing the lock mode, followed by terminating the program.

If the answer to the question of the step S33 is affirmative (YES), i.e. if NE>#LOCKNEL/H holds, it is determined at a step S34 whether or not the lock mode flag F_LOCKT assumes "1". When the present loop is executed without satisfying lock mode-executing conditions, the flag F_LOCKT is set to "0" at the step S26, and hence the answer to the question of the step S34 is negative (NO). Consequently, the program proceeds to a step S35, wherein it is determined whether or not the four filtered wheel speeds FVW1 to FVW4 are all equal to or lower than a predetermined speed #FVWREF (e.g. 5 km/h) indicative of a predetermined low-speed condition of the vehicle 2. The filtered wheel speeds FVW1 to FVW4 are obtained by subjecting the wheel speeds VW1 to VW4 detected by respective vehicle speed sensors 25 to a predetermined filtering process. If the answer to the question of the step S35 is negative (NO), i.e. if at least one of the filtered wheel speeds FVW1 to FVW4 is above the predetermined speed #FVWREF, which means that the vehicle 2 is normally running, it is judged that the lock mode is not required, and the program proceeds to the steps S23 et seq. without executing the lock mode, followed by terminating the program.

If the answer to the question of the step S35 is affirmative (YES), i.e. if the four filtered wheel speeds FVW1 to FVW4 are all equal to or lower than the predetermined speed #FVWREF, it is judged that the lock mode-executing conditions concerning the vehicle 2 have been satisfied, and it is determined at steps S36 et seq. in FIG. 3 whether or not the lock mode-executing conditions concerning the lock switch 26 are satisfied. This part of the present process is carried out so as to determine whether the lock switch signal LOCKSW from the lock switch 26 is for executing the lock mode or canceling the same, since the lock switch 26 is formed by a momentary switch as described hereinbefore, as well as to prevent the switching operation from causing chattering in the lock mode control.

First, it is determined at the step S36 whether or not the lock mode-setting switching condition satisfaction flag F_LOCKM1 assumes "1". When the present loop is executed before the lock mode-executing conditions are satisfied, the flag F_LOCKM1 is set to "0" at the step S24, and hence the answer to the question of the step S36 is negative (NO), so that the program proceeds to a step S37, wherein it is determined whether or not the lock switch flag F_LOCKSW assumes "1". If the answer to the question is negative (NO), which means that the lock switch 26 is not being depressed, it is determined at a step S38 whether or not the count of the lock counter CNT_LOCK for use in preventing chattering is equal to or larger than 4. If the answer to the question is negative (NO), the count of the lock counter CNT_LOCK is incremented by 1 at a step S39.

On the other hand, if the answer to the question of the step S38 is affirmative (YES), i.e. if CNT_LOCK≧4 holds, which means that satisfaction of the lock mode-executing conditions of the vehicle 2 is confirmed more than three consecutive times, it is judged that conditions for receiving a lock switch signal LOCKSW for executing the lock mode are satisfied, and the count of the lock counter CNT_LOCK is reset to "0" at a step S40, and at the following step S41, the lock mode-setting switching condition satisfaction flag F_LOCKM1 is set to "1". If the answer to the question of the step S37 is affirmative (YES), which means that the lock switch is depressed before satisfaction of the conditions for receiving the lock switch signal LOCKSW for executing the lock mode, the lock switch signal LOCKSW is ignored, and the count of the lock counter CNT_LOCK is reset to "0" at a step S42. After execution of the step S42, S39 or S41, the steps S25 et seq. are carried out, followed by terminating the program.

After execution of the step S41, i.e. after the conditions for receiving the lock switch signal LOCKSW for executing the lock mode are satisfied, the answer to the question of the step S36 is affirmative (YES), so that the program proceeds to a step S43, wherein it is determined again whether or not the lock switch flag F_LOCKSW assumes "1". If the answer to the question is negative (NO), i.e. if the lock switch 26 is not being depressed, the program proceeds to the steps S25 et seq., whereas if the answer to the question is affirmative (YES), i.e. if the lock switch 26 is being depressed, it is determined again at a step S44 whether or not the count of the lock counter CNT_LOCK is equal to or larger than 4. If the answer to the question of the step S44 is negative (NO), the count of the lock counter CNT_LOCK is incremented by 1 at a step S45, and then the program proceeds to the steps S25 et seq.

On the other hand, if the answer to the question of the step S44 is affirmative (YES), i.e. if CNT_LOCK≧4 holds, which means that the input of the lock switch signal LOCKSW is confirmed more than three consecutive times, it is judged that the lock mode-executing conditions are finally satisfied, and the count of the lock counter CNT_LOCK is reset to "0" at a step S46. Further, at a step S47, the lock mode-setting switching condition satisfaction flag F_LOCKM1 is set to "0", and then at steps S48 and S49, the lock mode-canceling switching condition satisfaction flag F_LOCKM2 and the lock mode flag F_LOCKT are set to "1", respectively. Then, at a step S50, the lock-mode transmitted torque LOCKD is calculated, and the lock mode is executed, as described in detail hereinafter. When the lock mode is started, the lock lamp is lit to notify the driver of the lock mode of the driving force control.

Figure 4:
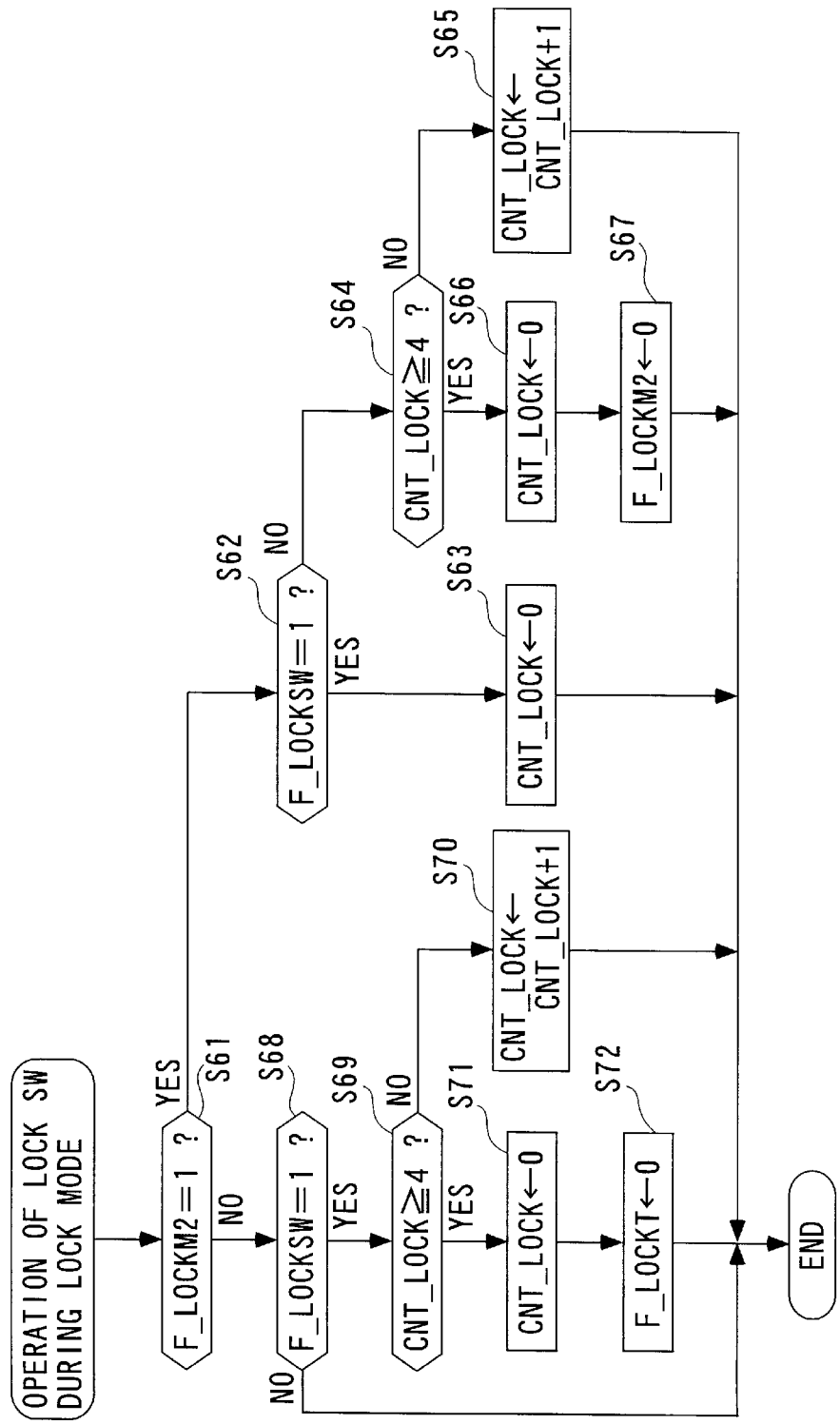
FIG. 4 is a flowchart showing a subroutine for carrying out processing in response to operation of a lock switch during a lock mode.

After the lock mode is started as described above, as long as the aforementioned conditions concerning the shift position POSI, the engine rotational speed NE, and so forth are maintained, the program passes through the step S34, with the answer to the question of this step being affirmative (YES), so that the program proceeds to a step S51, wherein processing in response to operation of the lock switch during the lock mode is carried out. FIG. 4 shows a subroutine for carrying out this processing, in which, first, it is determined at a step S61 whether or not the lock mode-canceling switching condition satisfaction flag F_LOCKM2 assumes "1". Immediately after the lock mode is started, the answer to the question is affirmative (YES), so that the program proceeds to a step S62, wherein it is determined whether or not the lock switch flag F_LOCKSW assumes "1". If the answer to the question is affirmative (YES), it is judged that the lock switch 26 is held in the depressed state after the vehicle 2 enters the lock mode, and the count of the lock counter CNT_LOCK is reset to "0" at a step S63, followed by terminating this program (subroutine).

If the answer to the question of the step S62 is negative (NO), i.e. if the lock switch 26 ceases to be operated or depressed after entering the lock mode, similarly to the steps S38 and S39, it is determined at a step S64 whether or not the count of the lock counter CNT_LOCK is equal to or larger than 4, and if the answer to the question is negative (NO), the count of the lock counter CNT_LOCK is incremented by 1 at a step S65, followed by terminating the program. On the other hand, if the answer to the question of the step S64 is affirmative (YES), i.e. if the termination of operation of the lock switch 26 is confirmed more than three consecutive times, it is judged that conditions for receiving the lock switch signal LOCKSW for cancellation of the lock mode are satisfied, so that the count of the lock counter CNT_LOCK is reset to "0" at a step S66, and at the same time the lock mode-canceling switching condition satisfaction flag F_LOCKM2 is set to "0" at a step S67, followed by terminating the program.

After execution of the step S67, the answer to the question of the step S61 is negative (NO), so that the program proceeds to a step S68, wherein it is determined again whether or not the lock switch flag F_LOCKSW assumes "1". If the answer to the question is negative (NO), i.e. if the lock switch 26 is not being operated during the lock mode, the program is terminated immediately. On the other hand, if the answer to the question of the step S68 is affirmative (YES), i.e. if the lock switch 26 is being depressed during the lock mode, it is determined again at a step S69 whether or not the count of the lock counter CNT_LOCK is equal to or larger than 4. If the answer to the question is negative (NO), the count of the lock counter CNT_LOCK is incremented by 1 at a step S70, whereas if the answer to the question is affirmative (YES), i.e. if the input of the lock switch signal LOCKSW is confirmed more than three consecutive times, it is judged that the lock mode should be cancelled, so that the count of the lock counter CNT_LOCK is reset to "0" at a step S71, and at the same time the lock mode flag F_LOCK is set to "0" at a step S72, followed by terminating the program. Thus, the lock mode is cancelled.

Figure 5:
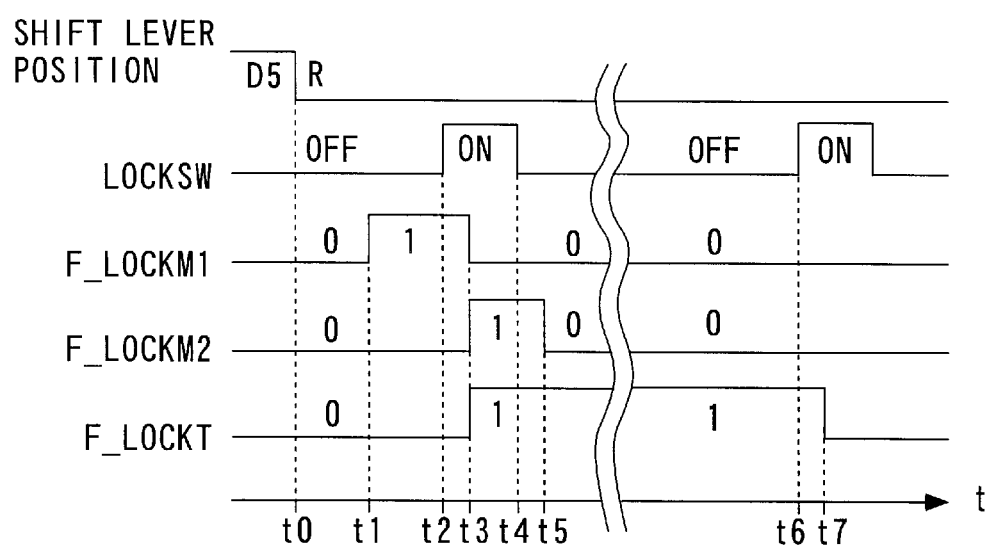
FIG. 5 is a timing chart showing the relationship between the operating state of the lock switch and execution/cancellation of the lock mode.

FIG. 5 shows an example of the relationship between the operating state of the lock switch 26 and the execution/cancellation of the lock mode. Assuming that the shift position is switched at a time t0 from "D5" to "R" and from this time on, the lock mode-executing conditions of the vehicle 2 are satisfied, first, the execution of the step S41 in FIG. 3 sets the lock mode-setting switching condition satisfaction flag F_LOCKM1 to "1" (time t1), and a lock mode execution-permitting state starts. When the lock switch 26 is depressed in this state (time t2), the answer to the question of the step S43 becomes affirmative (YES), and after the lapse of the counting time set to the lock counter CNT_LOCK (t3), the steps S47 to S49 are executed, whereby the flag F_LOCKM1 is set to "0", and the lock mode-canceling switching condition satisfaction flag F_LOCKM2 and the lock mode flag F_LOCKT are each set to "1", whereby the lock mode is started.

Thereafter, when the operation of the lock switch 26 is terminated (time t4), after the lapse of the counting time set to the lock counter CNT_LOCK (t5), the step S67 in FIG. 4 is executed, whereby the flag F_LOCKM2 is set to "0" again, and a lock mode cancellation-permitting state starts. When the lock switch 26 is depressed again in this state (time t6), the answer to the step S68 becomes affirmative (YES). Then, after the lapse of the counting time set to the lock counter CNT_LOCK (t7), the step S72 is executed, whereby the lock mode flag F_LOCK is set to "0", and the lock mode is cancelled. The lock mode control carried out as above makes it possible to execute (set) or cancel the lock mode properly in response to the lock switch signal LOCKSW from the lock switch 26 formed by a momentary switch. Further, the use of the lock counter CNT_LOCK makes it possible to avoid chattering of the lock mode control.

Referring again to FIG. 2, if the answer to the question of the step S31 is negative (NO), i.e. if the shift position is set to any of "D5", "D4", "3", "N" and "P", it is determined at a step S52 whether or not the lock mode flag F_LOCK assumes "1". If the answer to the question is negative (NO), i.e. if the lock mode is not being executed, the steps S22 et seq. are executed, followed by terminating the program. As described above, when the shift position is any of "D5", "D4", "3", "N" and "P", basically, the lock mode is not set irrespective of the operating state of the lock switch 26. The reason for this is that the driver generally operates the shift lever to select one of "R", "1", and "2" e.g. for extrication of the vehicle from its stuck condition, which requires large rear wheel-driving forces obtained by executing the lock mode. Thus, the lock mode control described hereinabove makes it possible to avoid unnecessarily executing the lock mode.

On the other hand, if the answer to the question of the step S52 is affirmative (YES), which means that the shift lever has been shifted to a shift position other than "R", "1", and "2" during the lock mode, it is determined at a step S53 whether or not the count of the lock mode cancellation timer TMLOCK is equal to or larger than a predetermined value #TMLOCKAT (e.g. a value equivalent to 3 sec.). If the answer to the question is negative (NO), i.e. if TMLOCK<#TMLOCKAT holds, the count of the timer TMLOCK is incremented at a step S54, followed by the program proceeding to the step S33. On the other hand, if the answer to the question of the step S53 is affirmative (YES), i.e. if TMLOCK≧#TMLOCKAT holds, the program proceeds to the steps S22 et seq., wherein the lock mode is cancelled.

As described above, when the shift lever is shifted to a shift position other than "R", "1", and "2" during the lock mode of the driving force control, the lock mode is automatically cancelled irrespective of the operating state of the lock switch 26. Consequently, it is possible to cancel the lock mode early, thereby shortening duration of the lock mode. Further, since the lock mode is cancelled after the lapse of the time period counted by the lock mode cancellation timer TMLOCK, even when the shift lever is temporarily shifted to a shift position other than "R", "1", and "2" e.g. during a quick operation of the shift lever carried out for extrication of the vehicle from its stuck condition, the lock mode is prevented from being cancelled, which makes it possible to maintain the large rear wheel-driving forces obtained by executing the lock mode. This makes it is possible to make the vehicle unstuck without difficulty.

Figure 6:
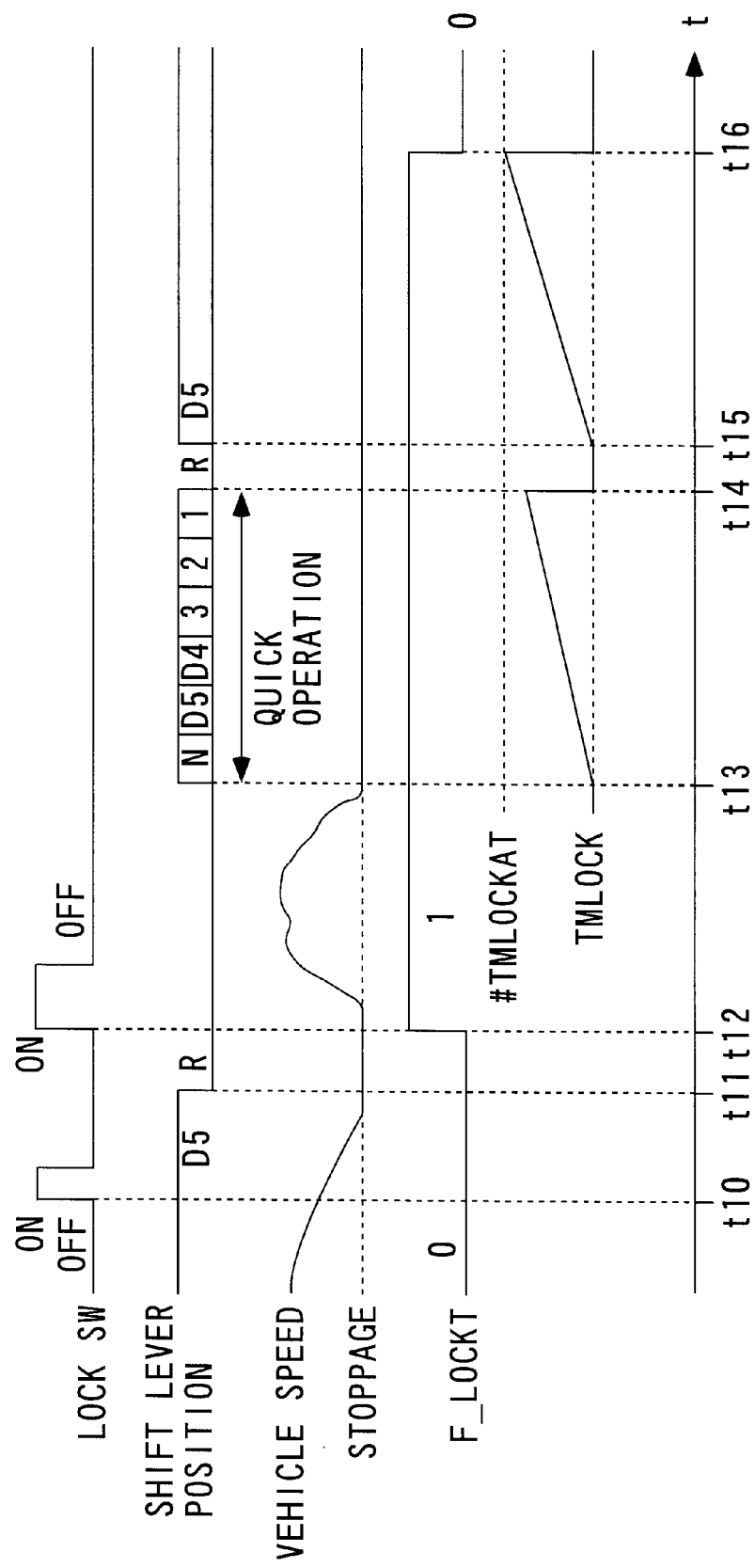
FIG. 6 is a timing chart showing the relationship between operating conditions of the vehicle, the operating state of the lock switch, and the execution/cancellation of the lock mode.

FIG. 6 shows a timing chart illustrating an example of the relationship between the operating conditions of the vehicle 2, the operating state of the lock switch 26, and the execution/cancellation of the lock mode. First, let it be assumed that the vehicle 2 is being decelerated with the shift position set to "D5". In this state, even if the lock switch 26 is depressed (time t10), the answers to the questions of the respective steps S31 and S52 in FIG. 2 are negative (NO), and hence the lock mode is not set. Thereafter, when the lock switch 26 is depressed (time t12) after the vehicle 2 stops and the shift position is set to "R" (time t11), the answer to the question of the step S43 in FIG. 3 becomes affirmative (YES), whereby the lock mode is executed.

Then, the vehicle 2 is started, stopped, and then restarted to get stuck, so the quick operation of the shift lever is carried out in the lock mode (time period t13 to t14). Since the count of the lock mode cancellation timer TMLOCK does not reach the predetermined value #TMLOCKAT during the time period (i.e. the answer to the question of the step S53 in FIG. 2 is negative (NO)), the lock mode is maintained, so that it is possible to make the vehicle unstuck without fail. Further, after completion of the quick operation (time t15), at a time point (time t16) when the count of the lock mode cancellation timer TMLOCK has reached the predetermined value #TMLOCKAT, the answer to the question of the step S53 becomes affirmative (YES), whereby the lock mode is automatically cancelled.

Figure 7:
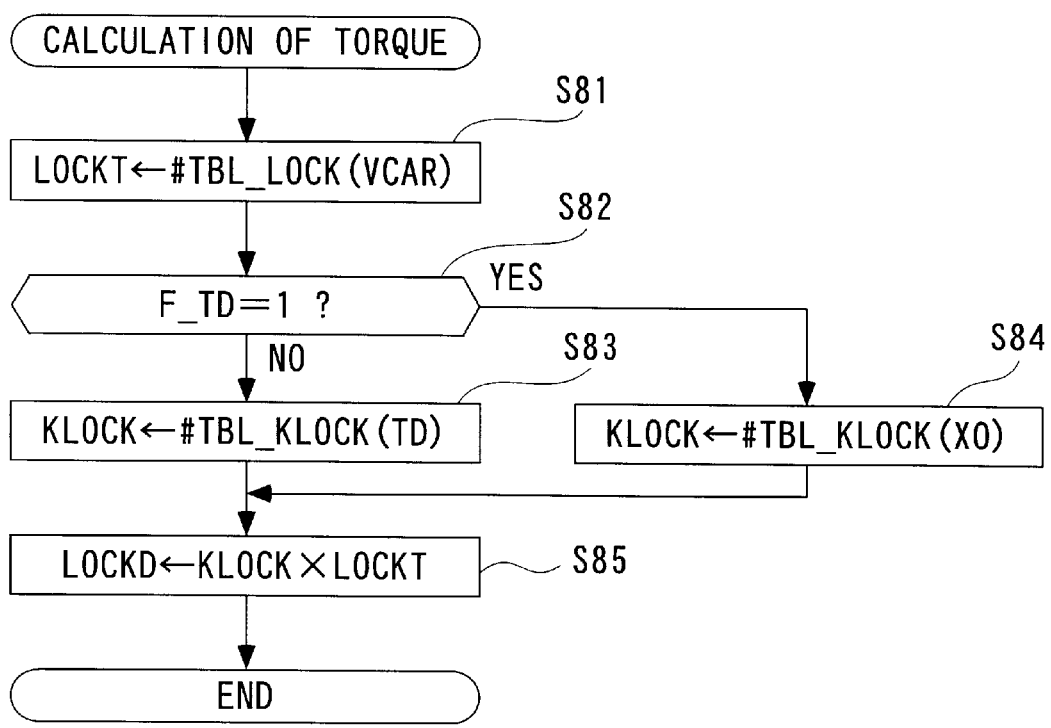
FIG. 7 is a flowchart showing a subroutine for a process for calculating lock-mode transmitted torque.
Figure 8:
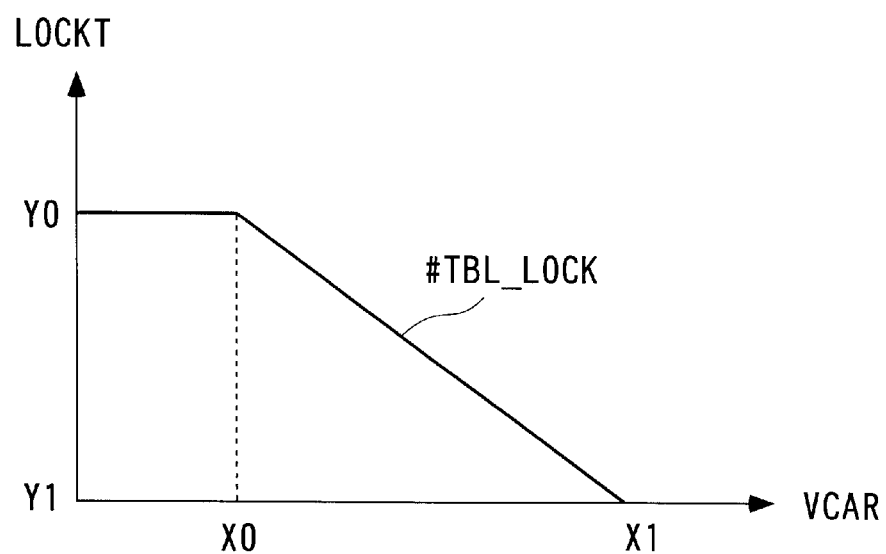
FIG. 8 is a diagram showing an example of a VCAR-LOCKT table.

Next, the process carried out at the step S50 in FIG. 3 for calculating the lock-mode transmitted torque LOCKD will be described with reference to FIG. 7. First, at a step S81, a table value #TBL_LOCK is retrieved from a VCAR-LOCKT table an example of which is shown in FIG. 8, according to a vehicle speed VCAR, and set to the basic value LOCKT of the lock-mode transmitted torque LOCKD. It should be noted that the vehicle speed VCAR is determined from the smaller one of the filtered left and right rear wheel speeds FVW3, FVW4.

In the VCAR-LOCKT table, the table value #TBL_LOCK is set to a predetermined maximum value Y0 (maximum transmitted torque) for a predetermined value X0 (e.g. 10 km/h) of the vehicle speed VCAR and values of the same smaller than X0, and to a predetermined minimum value Y1 (e.g. 0) for a predetermined value X1 (e.g. 30 km/h) of the vehicle speed VCAR and values of the same larger than X1. Further, the VCAR-LOCKT table is configured such that the table value #TBL_LOCK linearly decreases as the vehicle speed VCAR increases from X0 to X1. By thus setting the basic value LOCKT, it is possible to ensure the maximum lock-mode transmitted torque LOCKD when the vehicle speed VCAR is low. Further, since the lock-mode transmitted torque LOCKD is progressively reduced to 0 with an increase in the vehicle speed VCAR, it is possible to operate the electromagnetic clutches 10 efficiently according to the degree of necessity to transmit torque or driving forces to the rear wheels W3, W4.

Figure 10:
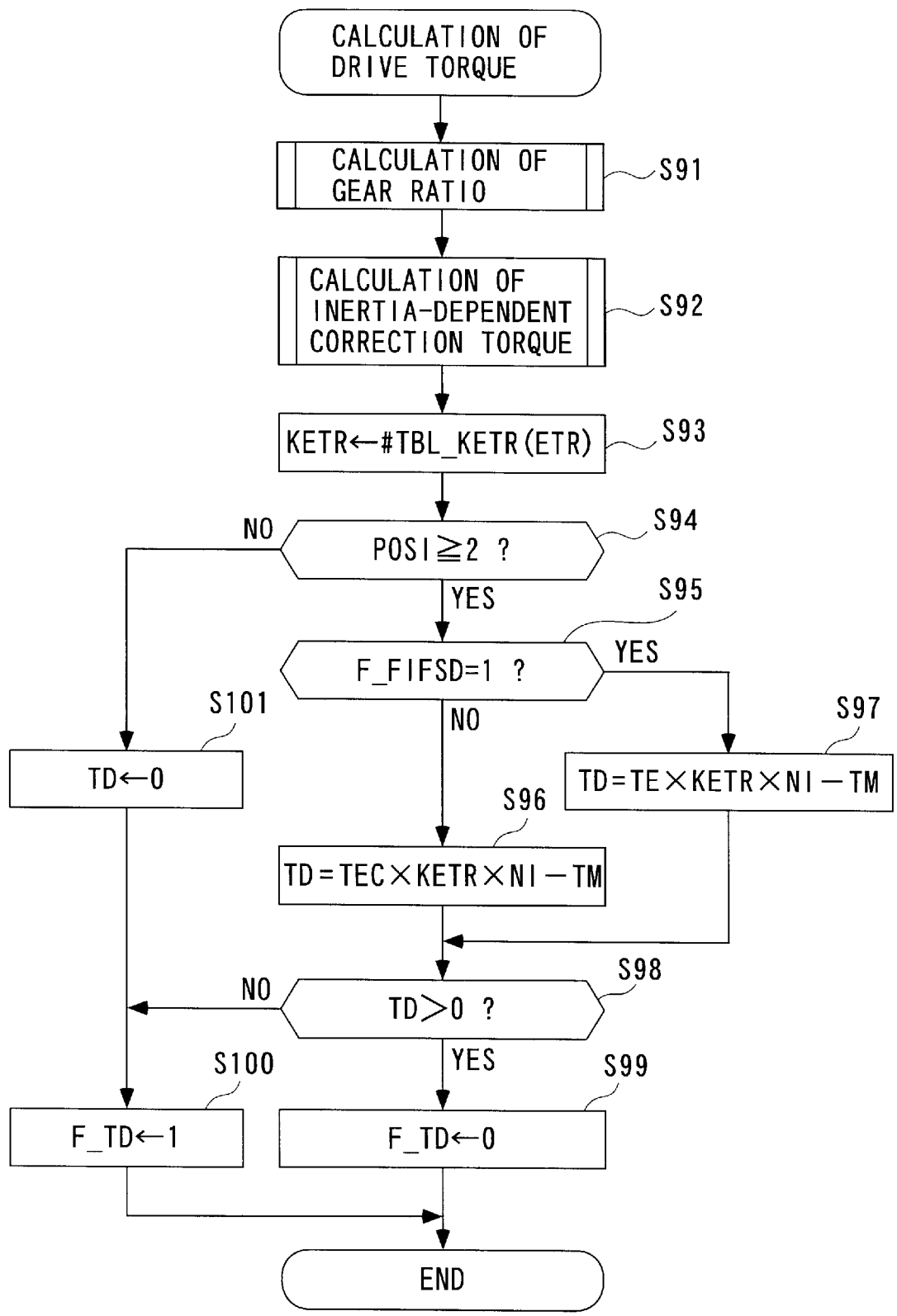
FIG. 10 is a flowchart showing a subroutine for a process for calculating a drive torque.

Next, it is determined at a step S82 whether or not a drive torque flag F_TD assumes "1". The drive torque flag F_TD is set in the drive torque-calculating process shown in FIG. 10, which will be described in advance hereafter. According to this process, the drive torque TD output to the output side of the automatic transmission 4 is calculated based on the engine torque generated by the engine 3.

First, at a step S91, a gear ratio-calculating process is carried out to determine a gear ratio N1 based on the shift position POSI and the gear position SFT. Then, an inertia-dependent correction torque-calculating process is carried out at a step S92 to determine an inertia-dependent correction torque TM. The torque required for rotating the wheels W1 to W4 for acceleration depends on the gear position of the transmission 4, and for the purpose of taking the gear position-dependence of the required torque into account, the inertia-dependent correction torque TM is calculated based on the shift position POSI, gear position SFT, the accelerations of the wheels W1 to W4, though detailed description thereof is omitted.

Next, according to the input/output rotational speed ratio ETR of the torque converter 4a, a table value #TBL_KETR is retrieved from a table, not shown, and set to a torque converter-dependent amplification factor KETR at a step S93. Then, it is determined at a step S94 whether or not the value of the shift position POS is equal to or higher than 2. If this answer is affirmative (YES), i.e. if the shift position is set to any one of "1" to "D5" and "R", it is determined at a step S95 whether or not a fail-safe flag F_FIFSD assumes "1". If the answer to this question is negative (NO), i.e. if no faulty condition of the engine 3 is detected, the program proceeds to a step S96, wherein the net drive torque TD is calculated based on the gear ratio NI, the inertia-dependent correction torque TM and the toque converter-dependent amplification factor KETR by using the following equation:

$$TD=TEC \times KETR \times NI-TM$$

wherein TEC represents a value of the basic engine torque TE calculated based on the intake pipe absolute pressure PBA and the engine rotational speed NE, which is corrected e.g. in dependence on the engine coolant temperature and intake air temperature.

On the other hand, when the answer to the question of the step S95 is affirmative (YES), i.e. if a faulty condition of the engine 3 is detected, the program proceeds to a step S97, wherein the drive torque during a faulty condition of the engine 3 is calculated based on the basic engine torque, by using the following equation:

$$TD=TE \times KETR \times NI-TM.$$

Next, it is determined at a step S98 whether or not the drive torque TD calculated at the step S96 or S97 is larger than 0. If the answer to this question is affirmative (YES), i.e. if TD>0 holds, which means the vehicle is accelerating, the drive torque flag F_TD is set to "0" at a step S99, whereas if the answer to the question of the step S98 is negative (NO), i.e. if TD≦0 holds, which means the vehicle is decelerating, the drive torque flag F_TD is set to "1" at a step S100, followed by terminating the program (subroutine). Further, if the answer to the question of the step S94 is negative (NO), which means that the shift position is set to any of "N", "P", "R", or in no-position, it is judged that the vehicle 2 is in stoppage, so that the drive torque TD is set to zero at a step S101, and then the step S100 is carried out to set the drive torque flag F_TD to "1", followed by terminating the program. Thus, the drive torque flag F_TD is set to "0", when TD>"0" holds, and hence the vehicle is accelerating, whereas the same is set to "1" when TD≦"0", holds, and hence the vehicle 2 is decelerating or in stoppage.

Figure 9:
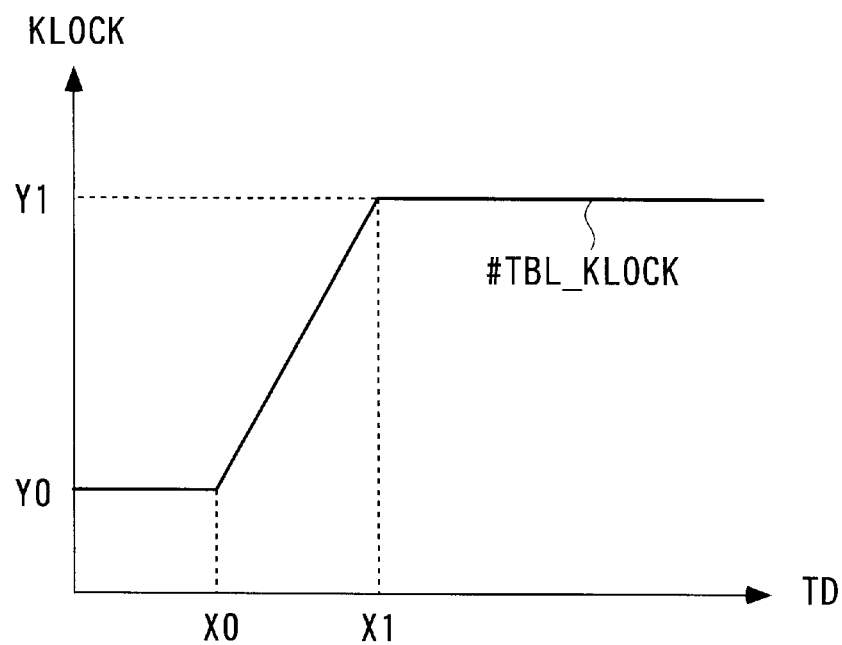
FIG. 9 is a diagram showing an example of a VCARK-LOCK table.

Referring again to FIG. 7, if the answer to the question of the step S82 is negative (NO), i.e. if F_TD=0 holds, which means that the vehicle is accelerating, a table value #TBL_KLOCK is retrieved from a TD-KLOCK table an example of which is shown in FIG. 9 according to the drive torque TD, and set to the power-saving coefficient KLOCK. In this table, the table value #TBL_KLOCK is set to a predetermined value Y0 below 1.0 for a predetermined value X0 (e.g. 0) of the drive torque TD and values of the same smaller than X0, and set to a predetermined value Y1 (e.g.

1.0) for a predetermined value X1 of the drive torque TD or values of the same larger than X1. Further, the TD_KLOCK table is configured such that the table value #TBL_KLOCK linearly increases as the drive torque TD increases from the predetermined value X0 to the predetermined value X1.

On the other hand, if the answer to the question of the step S82 is affirmative (YES), i.e. if F_TD=1 holds, which means that the vehicle is decelerating or in stoppage, a table value #TBL_KLOCK corresponding to the predetermined torque X0 is obtained, and set to the power-saving coefficient KLOCK. More specifically, during the deceleration or stoppage of the vehicle, the power-saving coefficient KLOCK has the minimum predetermined value Y0 set thereto.

Then, the basic value LOCKT obtained at the step S81 is multiplied by the power-saving coefficient KLOCK set at the step S83 or S84 to calculate the lock-mode transmitted torque LOCKD at a step S85, followed by terminating the program.

As described above, according to the present embodiment, the basic value LOCKT is set based on the vehicle speed VCAR, and when the vehicle speed VCAR is equal to or smaller than the predetermined value X0, the basic value LOCKT is set to the maximum value LOCKTY0. Further, when the vehicle is accelerating and the drive torque TD is equal to or larger than the predetermined value X1, the power-saving coefficient KLOCK is set to 1.0. When the basic value LOCKT=the maximum value LOCKTY0, and at the same time, the power-saving coefficient KLOCK=1.0 hold, the lock-mode transmitted torque LOCKD is set to the maximum transmitted torque (=LOCKTY0×KLOCK=LOCKTY0). The engagement forces of the respective electromagnetic clutches 10 obtained at this time are the maximum clutch engagement forces corresponding to the maximum transmitted torque, which can lock the front wheels W1, W2 and the rear wheels W3, W4 to each other.

Further, even when the vehicle is accelerating, if the drive torque TD is below the predetermined value X1, the power-saving coefficient KLOCK is set as above, whereby the engagement forces of the electromagnetic clutches 10 are made smaller than the maximum lockable clutch engagement forces which enables the locking, and set to smaller values as the drive torque is smaller. That is, the lock-mode transmitted torque LOCKD is set to a smaller value dependent on the drive torque TD. For instance, when the accelerator pedal is seldom stepped on e.g. when the vehicle is running during traffic congestion, acceleration of the vehicle is small, and the drive torque TD is very small, so that the clutch engagement forces are largely reduced. In other words, the lock-mode transmitted torque LOCKD is reduced. On the other hand, during deceleration of the vehicle, the power-saving coefficient KLOCK is set to the minimum value Y0, whereby the lock-mode transmitted torque LOCKD is also set to the minimum value dependent on the basic value LOCKT. As a result, it possible reduce electric power consumption according to this reduction of the engagement forces of the electromagnetic clutches 10 and thereby save electric power.

As described above, according to the present embodiment, the lock mode is not set only by depressing the lock switch 26, but the lock mode setting is permitted on condition that the vehicle speed is lower than a predetermined value #FVWREF, and the shift position of the automatic transmission is "R", "1", or "2". Therefore, it is possible to execute the lock mode when the lock mode is really necessary, in dependence on conditions of the vehicle 2. Further, during the lock mode, if the shift lever is shifted to a position other than "R", "1", and "2", the lock mode is automatically cancelled without waiting for the driver to operate the lock switch 26, which makes it possible to cancel the lock mode early. As a result, it is possible to reduce the frequency and duration of the lock mode in which the electromagnetic switches have to be operated by supplying the solenoid coils thereof with the maximum amount of current to obtain the maximum clutch engagement forces. This contributes to saving of electric power consumed by the electromagnetic clutches, reduced size and increased durability of the clutches, and excellent fuel economy and drivability.

Further, the automatic cancellation of the lock mode is carried out after the lapse of time measured by the lock mode cancellation timer TMLOCK. Therefore, it is possible to maintain the lock mode when the shift lever is shifted across shift positions other than "R", "1", and "2" during quick operation of the shift lever to make the vehicle unstuck, thus enabling the extrication from the stuck condition by the quick operation of the shift lever without any problem.

Further, the engagement forces of the electromagnetic clutches 10 can be controlled properly in dependence on the actual drive torque TD delivered from the engine 3 to the main drive wheels W1, W2, such that the clutch engagement forces are made smaller as the drive torque TD is smaller. This makes it possible to efficiently operate the electromagnetic clutches 10 during the lock mode, whereby compared with prior art in which in the lock mode, the clutch engagement forces are set to a fixed maximum value, the power consumption can be largely reduced to save electric power.

Further, the present invention is not limited to the above-described embodiment, but it can be put into practice in various forms. For instance, in the above embodiment, the transmission is a five-speed automatic transmission, this is not limitative, but the invention may be applied to a continuously variable transmission. In such a case, the predetermined low-speed shift positions as a condition for executing or canceling the lock mode can be determined from the operating state of a switch selected such that the gear reduction ratio is within a desired predetermined range.

Further, although in the above embodiment, the invention is applied, by way of example, to the driving force control system for a part-time four-wheel-drive vehicle with a front-wheel drive mode as its main drive mode, this is not limitative, but similarly, the invention can be also applied to a part-time four-wheel-drive vehicle with a rear-wheel drive mode as its main drive mode.

It is further understood by those skilled in the art that the foregoing is a preferred embodiment of the invention, and that various changes and modifications may be made without departing from the spirit and scope thereof.

What is claimed is:

1. A driving force control system for a four-wheel drive vehicle including a pair of front wheels, a pair of rear wheels, an engine, a transmission for connecting one of said pair of front wheels and said pair of rear wheels to said engine, as main drive wheels, and clutches for connecting another of said pair of front wheels and said pair of rear wheels to said main drive wheels, as auxiliary drive wheels, the driving force control system controlling engagement forces of said clutches to thereby control distribution of a driving force of said main drive wheels to said auxiliary drive wheels, the driving force control system comprising:
  input means for being operated by a driver;
  lock mode execution means for executing a lock mode in which said engagement forces of said clutches are set to predetermined maximum engagement forces, when said input means is operated;

low vehicle speed condition-determining means for determining whether or not said vehicle is in a predetermined low vehicle speed condition;

shift position-detecting means for detecting a shift position of a shift lever being operated by the driver;

lock mode execution-permitting means for permitting said lock mode execution means to execute said lock mode, when said low vehicle speed condition-determining means determines that said vehicle is in said predetermined low vehicle speed condition, and at the same time said shift position-detecting means detects any of predetermined low-speed shift positions of said shift lever; and lock mode-canceling means for canceling said lock mode when said shift position-detecting means detects any shift position other than said predetermined low-speed shift positions of said shift lever irrespective of whether or not said input means is operated.

2. A driving force control system according to claim 1, said lock mode-canceling means cancels said lock mode after said lock mode execution-permitting means starts said lock mode, when said input means is operated.

3. A driving force control system according to claim 1, wherein said lock mode-canceling means cancels said lock mode upon the lapse of a predetermined time period after said shift position-detecting means detects said any shift position other than said predetermined low-speed shift positions of said shift lever.

4. A driving force control system for a four-wheel drive vehicle including a pair of front wheels, a pair of rear wheels, an engine, a transmission for connecting one of said pair of front wheels and said pair of rear wheels to said engine, as main drive wheels, and clutches for connecting and disconnecting another of said pair of front wheels and said pair of rear wheels to said main drive wheels, as auxiliary drive wheels, the driving force control system controlling connection and disconnection of said clutches to thereby connect and disconnect said main drive wheels to said auxiliary drive wheels, and controlling engagement forces of said clutches to thereby control distribution of a driving force of said main drive wheels to said auxiliary drive wheels, the driving force control system comprising:

input means for being operated by a driver;

lock mode execution means for executing a lock mode in which said engagement forces of said clutches are set to predetermined maximum engagement forces, when said input means is operated;

shift position-detecting means for detecting a shift position of a shift lever being operated by the driver; and lock mode-canceling means for canceling said lock mode when said shift position-detecting means detects any shift position other than predetermined low-speed shift positions of the shift lever, during execution of said lock mode.

5. A driving force control system according to claim 4, wherein said lock mode-canceling means cancels said lock mode upon the lapse of a predetermined time period after said shift position-detecting means detects said any shift position other than said predetermined low-speed shift positions of said shift lever.

* * * * *